March 15, 1966     D. N. MARTIN ET AL     3,240,070
SAMPLE SUPPLY APPARATUS

Filed Oct. 7, 1963     4 Sheets-Sheet 1

INVENTORS
DONALD N. MARTIN
BY CARLTON W. JOHNSON

ATTORNEY

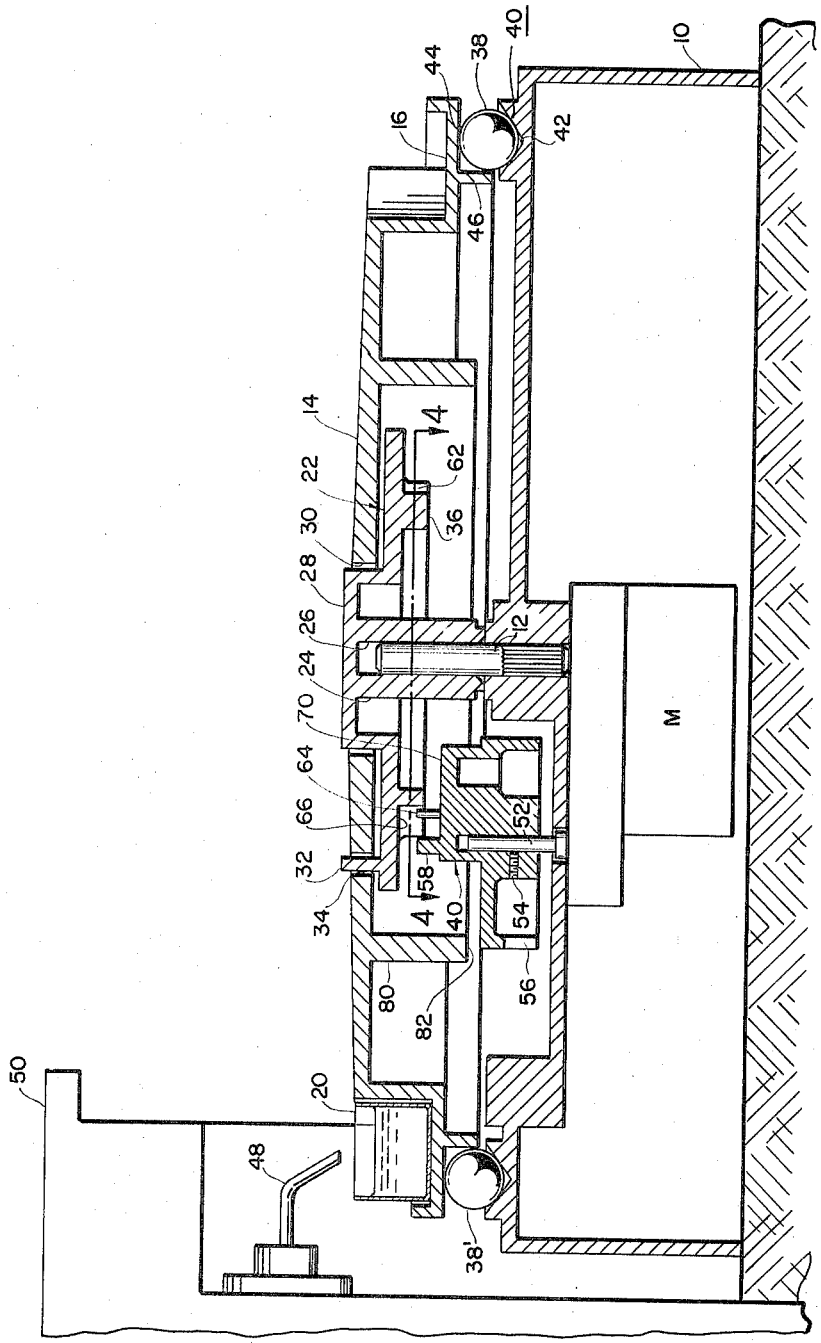

March 15, 1966  D. N. MARTIN ET AL  3,240,070
SAMPLE SUPPLY APPARATUS
Filed Oct. 7, 1963  4 Sheets-Sheet 3

INVENTORS
DONALD N. MARTIN
BY CARLTON W. JOHNSON

ATTORNEY

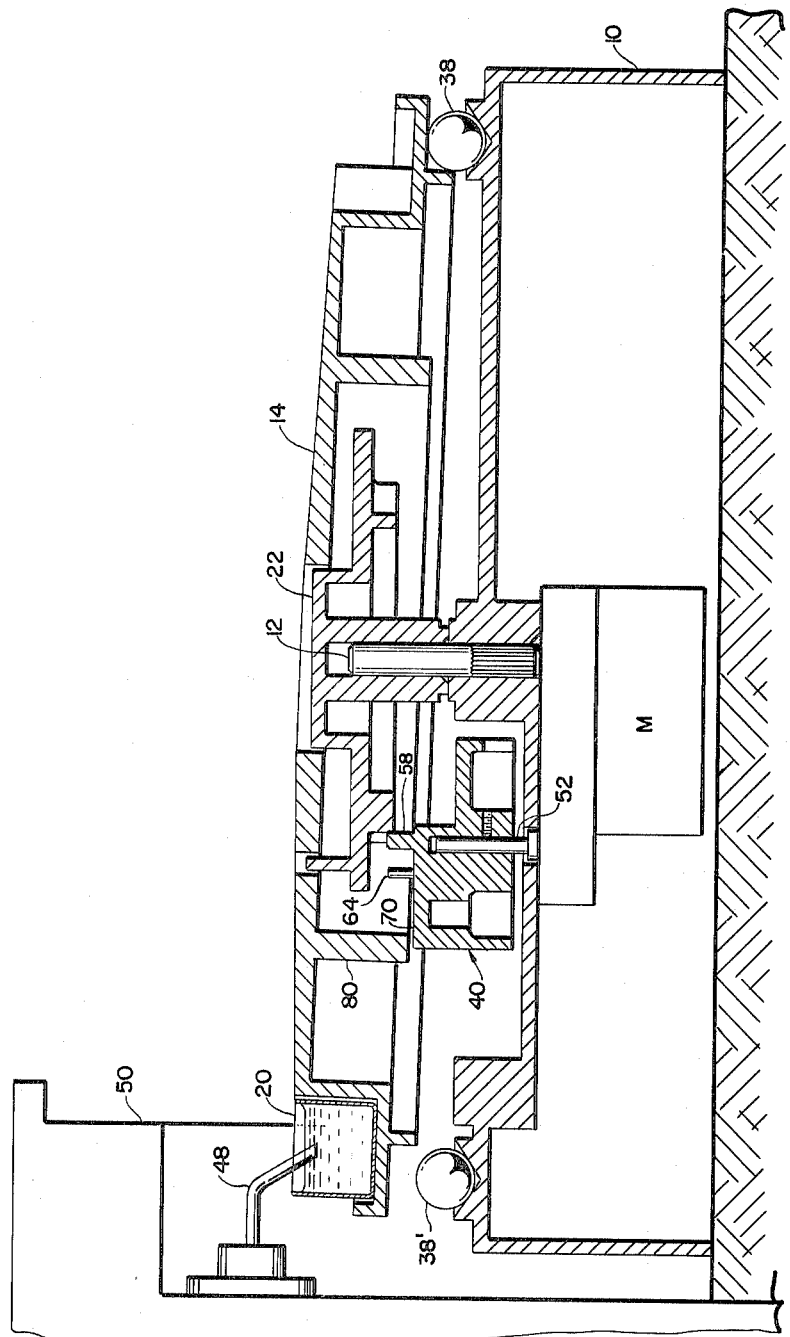

United States Patent Office 3,240,070
Patented Mar. 15, 1966

3,240,070
SAMPLE SUPPLY APPARATUS
Donald N. Martin, Whittier, and Carlton W. Johnson, Los Angeles, Calif., assignors to Beckman Instruments, Inc., a corporation of California
Filed Oct. 7, 1963, Ser. No. 314,336
18 Claims. (Cl. 73—423)

This invention relates to automatic sample feeding devices and, in particular, to an apparatus for supplying a series of samples to an analyzing apparatus or the like.

Sample feeding devices of the type to which the present invention relates are disclosed in United States Patent No. 2,879,141 to Skeggs and United States Patent No. 3,038,340 to Isreeli. Each of these patents disclose a sample feeding device in which a series of samples are positioned on a rotary plate and a pivoted sample intake mechanism is positioned adjacent to the plate. The sample intake mechanism is pivoted into sample receptacles on the plate and samples are withdrawn through the intake by a pump or the like. Thus, in each of these devices it is required that the sample intake device be connected to an analyzing apparatus or other instrument to which the sample is to be delivered. This type of system has certain disadvantages in particular applications. Namely, in some situations it is not possible to connect a pivoting sample intake tube to the analyzing apparatus. This is particularly true in those cases in which the analyzing apparatus is provided with a capillary sample intake tube and in which there is not provided a pump for delivering sample from a pivoting sample intake tube on the feeding device into the apparatus. Also, it is sometimes advantageous to have a sample feeding device which may be quickly positioned under a sample intake tube of an analyzing apparatus and withdrawn therefrom without requiring the connection of sample delivery tubes between the apparatus and the feeding device.

It is therefore the principal object of the present invention to provide a simple and inexpensive sample feeding device capable of feeding a plurality of different liquid samples to an analyzing apparatus or the like without any sample delivery tube connected therebetween.

Another object of the invention is to provide an automatic sample feeding device for delivering, in succession, a plurality of different samples which device may be readily positioned under a fixed sample intake mechanism of an analyzing apparatus and the samples are successively moved into position to contact the end of the sample intake mechanism.

Still a further object of the present invention is to provide a sample feeding device in which a plurality of samples are positioned upon a rotary plate and the plate is intermittently rotated and tilted into successive positions to deliver the samples to a fixed sample intake device.

In accordance with the principal aspect of the present invention, there is provided a sample feeding device for delivering a series of different samples to an analyzing apparatus or the like in which the samples are positioned in a row on the top of a rotary plate. The plate is mounted so that a portion of the plate may be raised above the normal horizontal plane of the plate to deliver a sample thereon to a fixed sample intake tube on the analyzing apparatus. Means are provided for intermittently rotating the plate and raising the plate to such position and to withdraw the plate from said raised position at predetermined time intervals. Thus, by this system the samples on the rotary plate are delivered to a sample intake tube rather than requiring that a sample intake tube be connected to the analyzing apparatus and moved into the samples on the rotary plate.

Other objects, aspects and advantages will become apparent from the following description taken in connection with the accompanying drawings wherein:

FIG. 2 is a sectional view of the feeding apparatus taken along line 2—2 of FIG. 1 with the apparatus being shown as positioned beneath the sample intake tube of an analyzing apparatus;

FIG. 5 is similar to FIG. 2 but shows the sample plate in a tilted position.

Figure 1:
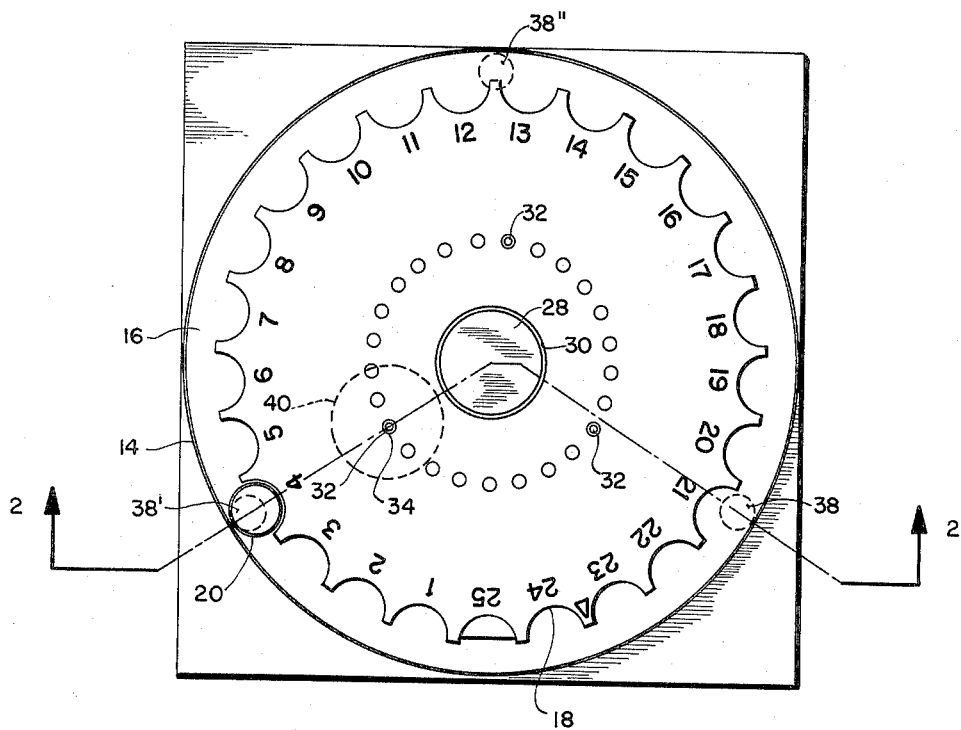
FIG. 1 is a top view of the feeding apparatus of the present invention.

Referring now to the drawings in detail, the sample feeding device comprises a hollow base 10 having centrally positioned therein a fixed shaft 12 about which a sample plate 14 may rotate. The sample plate is provided with a channel 16 at its outer periphery and is shaped to provide a plurality of indentations 18 which uniformly position sample receptacles in a circular row on the plate, there being only one of such receptacles 20 illustrated in the drawings. Although there have been shown 25 indentations for holding sample receptacles on plate 14, it should be appreciated that any suitable number of receptacle indentations could be provided and the present invention is not limited to the number illustrated in the drawings.

An intermediate rotary plate 22 is provided having a boss 24 depending from the lower surface thereof and a central opening 26 in the boss which receives the shaft 12. The opening 26 is of sufficient size to permit plate 22 to rotate freely about the shaft 12. The plate 22 has a central upstanding portion 28 which protrudes slightly through a central opening 30 in the sample plate 14. Also, the plate 22 includes three vertical pins 32 symmetrically positioned about the outer circumference of the plate which extend through openings 34 in the sample plate 14. As best seen in FIG. 2, there is a circular row of the openings 34 equal in number to the indentations 18. It is preferable to have a large series of openings 34 so that the sample plate may be readily connected to the intermediate plate 22 with the pins 32 extending through three of the openings 34. It is noted that there is a substantial space left between the outer surface of the upstanding portion 28 of the intermediate plate 22 and opening 30 in the sample plate and also between the pins 32 and the openings 34 in the sample plate so that the sample plate may be tilted without binding against plate 22. Formed in the bottom of the intermediate plate 22 is a Geneva wheel 36 which cooperates with an actuating cam 40 which will be described in further detail below.

The rotary sample plate 14 is mounted on the base 10 on three ball bearings 38, 38′ and 38″ symmetrically positioned about the shaft 12. These ball bearings are positioned in recesses 40 in the top of the base and fixed therein by any suitable means such as an epoxy resin. The ball bearings provide a curved bearing surface 44 which provides a minimum frictional contact between the sample plate and the mounting therefor. The sample plate is further provided with an annular ring 46 on the bottom of the plate which contacts the inner surfaces of the three ball bearings so that the plate may be centrally located on the base 10 and thus cannot be shifted from this central position. The three ball bearings 38 thus provide a very simple and inexpensive means for mounting the sample plate 14.

The actuating cam or mechanism 40 for intermittently rotating the sample plate 14 and tilting the plate so that the sample receptacle 20 may be moved upwardly is positioned between the fixed shaft 12 and one of the ball bearings 38' as best seen in FIG. 2. The actuating cam, as described below, is arranged to tilt or lift the cam plate at a position between the shaft 12 and the ball bearing 38 about an axis X—X which is a line which passes through ball bearings 38 and 38" on the opposite side of the base 10. It can be appreciated that by pivoting or tilting the sample plate 14 about the axis X—X, the sample plate will be moved from a horizontal plane into a second plane which is at an angle to the horizontal plane thus raising the sample receptacle 20 upwardly to receive the end of a sample intake tube or capillary tube 48 which is fixedly mounted in an analyzing apparatus or the like 50. It can be readily appreciated that by this arrangement the apparatus of the present invention may be easily positioned under a fixedly positioned sample intake tube of an analyzing apparatus and the sample plate may be tilted about the axis X—X to position the sample so that it may be withdrawn by the sample intake tube 48.

Figure 4:
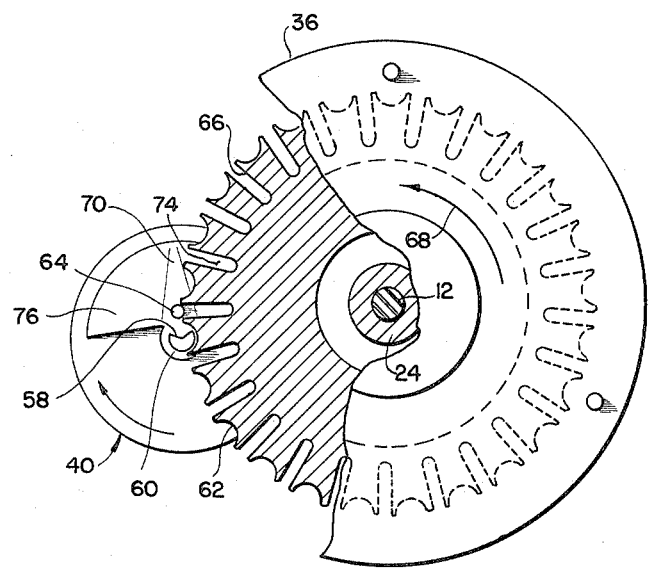
FIG. 4 is a sectional view taken through line 4—4 in FIG. 2 showing the details of the mechanism for intermittently rotating the sample plate.
Figure 3:
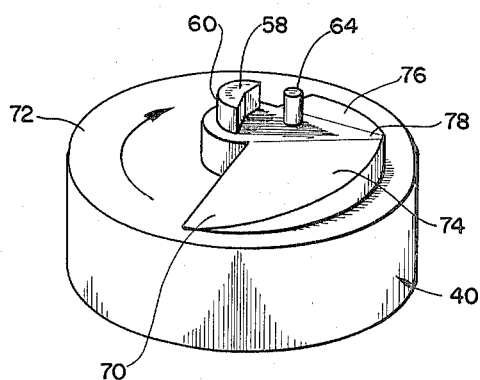
FIG. 3 is a perspective view of the cam used to intermittently rotate the sample feeding plate and to lift the plate for delivering samples to a desired position.

The actuating cam 40 is utilized to intermittently rotate the sample plate 14 to position the samples under the sample intake tube 48 and for lifting the samples by tilting the plate about axis X—X. The actuating cam is rotatably mounted on a shaft 52 which is driven through suitable gearing means, not shown, by a motor M. The cam 40 is fixed to the shaft 52 by means of a set screw 54. A slot 56 in the bottom side of cam 40 permits access to the set screw for fixing the cam to the shaft 52. The portion of the cam which permits the intermediate rotation of the sample plate, as best seen in FIG. 3, includes a central locking member 58 having a curved surface 60 which is adapted to engage the arcuate outer surfaces 62 of the Geneva wheel 36 formed in the undeside of the intermediate plate 22. The cam also includes an upstanding actuating pin 64 which is movable into the slots 66 in the Geneva wheel 36 for intermittently rotating the Geneva wheel. There are an equal number of slots 66 to the indentations for sample receptacles 20 so that intermittent rotation of the Geneva wheel will properly position each successive receptacle under the intake tube 48. As is well known in the art, when the actuating cam 40 is rotated by the motor M the actuating pin 36 will be shifted into a position, as seen in FIG. 4, in which it about engages the slot 66 in the Geneva wheel. With further rotation of the cam in the clockwise direction as seen in FIG. 4, the pin will slide into the slot 66 and will intermittently step the Geneva wheel in the direction shown by the arrow 68. The arcuate surface 62 of the Geneva wheel rides along the curved surface 60 of the locking member 58 during the period after the withdrawal of the actuating pin 64 from the slot 66 and prior to insertion of the pin into the following slot. Thus, when the actuating pin 64 moves out of engagement from a slot in the Geneva wheel the curved surface 60 of the locking member will be constantly in engagement with the outer curved surface of the wheel, thus retaining the wheel in a locked position during what may be considered a dwell period. Therefore, it can be readily seen that continuous rotation of the actuating pin 40 permits the intermediate movement of the Geneva wheel 36 and thus, through the connection of the intermediate plate 22 through pins 34 to the sample plate 14, the sample plate will be intermittently rotated about the central axis of the shaft 12.

The actuating cam 40 also includes an upwardly facing cam surface 70 which is provided on only one half of the upper surface 72 of cam 40. This cam surface includes two sloping surfaces 74 and 76 which rise to a high point 78 which is in alignment with a radial line extending from the center of the locking member 58 to the actuating pin 64 of the Geneva wheel actuating mechanism. The rotary sample plate 14 is provided with an annular ring 80 which extends from the lower surface of the plate and provides a smooth surface 82 which constitutes a cam follower surface which cooperates or is engaged by the cam surface 70 of the actuating cam 40. It can be readily appreciated that when the sloping surface 74 of the actuating cam 40 engages the lower surface 82 of the annular ring 80, the sample plate 14 will be lifted from the horizontal position as seen in FIG. 1 to the position shown in FIG. 5 in which the sample plate is pivoted about the axis X—X. In this position, the sample receptacle 20 is lifted into a position so that it receives the end of the sample intake tube 48 of an analyzing apparatus.

The over-all operation of the actuating cam and its functions can be best appreciated by following the movements of the intermediate plate 22 and sample plate 14 during a single revolution of the actuating cam. When the actuating pin 64 on cam 40 is in the position shown in FIG. 4, the pin is just engaging a slot 66 of the Geneva wheel 36 to cause the Geneva wheel to be rotated in a counter clockwise direction. Further rotation of cam 40 in the clockwise direction will fully sequence or index the wheel to its next successive position to successively position a sample receptacle underneath the sample intake tube 48. During this movement of the cam 40, the cam surface 70 for actuating or lifting the rotary plate is withdrawn from the surface 82 of the bottom of the plate. After further rotation of cam 40, the pin 64 is withdrawn from the slot 66 in the Geneva wheel and the curved surface 60 of the locking member 58 then engages the curved outer surfaces of the next adjacent tooth of the Geneva wheel to lock it in position during a dwell period. During this dwell period, the inclined surface 74 of the actuating cam then engages the surface 82 on the bottom of the rotary sample plate 14 and causes the plate to be lifted up to the position shown in FIG. 5, which shows the highest point of the cam 78 engaging the surface 82. Further rotation of the cam actuator 40 in the clockwise direction permits the rotary plate due to its own weight to be shifted back into its horizontal position as the surface 82 on the bottom of the plate slides down the inclined surface 76 of the actuating cam. Thus, it can be seen that by single rotation of the actuating cam, the rotary plate is intermittently moved to a successive position for positioning an additional sample receptacle under the sample intake tube 48. During the dwell period, which occurs between the intermittent rotary movements of the sample plate, the plate is tilted about the axis X—X to lift the sample to a position to be received by the sample intake tube. Thus, continuous rotation of the rotary actuating cam 40 permits a continuous and automatic delivery of a plurality of samples to a fixed sample intake tube or the like.

It can be appreciated that by merely mounting the sample plate on three ball bearings with the ring 46 bearing thereagainst, no elaborate or accurate bearing surfaces are required for maintaining the plate coaxial with the fixed shaft 12. Also, since the plate is moved upwardly through a pivoting or tilting action about the axis X—X, there is no necessity for very accurate bearing surfaces which would be otherwise necessary if the plate were moved horizontally to a second plane. It is further noted that the construction of the present invention is very simple and inexpensive mostly in view of the fact that the actuating cam 40 is a single member providing both for the intermittent rotation of the sample plate and for the lifting of the plate into its desired position at successive intervals.

Although only one embodiment of the invention has been disclosed herein for purposes of illustration, it will be readily understood that various changes can be made in the form, details, arrangement and proportions of the various parts without departing from the spirit and scope of the invention as defined by the appended claims.

What is claimed is:

1. In an apparatus for supplying samples to a sample intake device of an analyzing apparatus or the like, the combination of:
- a rotary plate having means for holding a plurality of samples in a row thereon;
- means mounting said plate for pivotal movement about an axis defined by a line lying substantially in the plane of said plate and offset from the center of rotation of said plate; and
- means operatively associated with said plate for intermittently rotating said plate and pivoting said plate about said axis to supply said samples in succession to said sample intake device.

2. An apparatus as set forth in claim 1 wherein said means for rotating and pivoting said plate includes a single rotary cam member and means for rotating said cam member.

3. In an apparatus for supplying samples to a sample intake device of an analyzing apparatus or the like, the combination of:
- a rotary plate having means for holding a plurality of samples in a row thereon;
- means normally positioning said plate in a first plane and for permitting said plate to be tilted into a second plane disposed at an angle to said first plane; and
- means operatively associated with said plate for intermittently rotating said plate and tilting said plate into said second plane to supply said samples in succession to said sample intake device.

4. In an apparatus for supplying samples to a sample intake device of an analyzing apparatus or the like, the combination of:
- a rotary plate including a plurality of sample receptacles positioned in a row thereon and said plate being normally positioned in a substantially horizontal plane;
- means for lifting a portion of said plate above said horizontal plane to raise said receptacles into a position for receiving said sample intake device; and
- means operatively associated with said plate for intermittently rotating said plate to move said sample receptacles in succession to said sample intake device.

5. In an apparatus for supplying samples to a sample intake device of an analyzing apparatus or the like, the combination of:
- a rotary plate including a plurality of sample receptacles positioned in a row thereon and said plate being normally positioned in a substantially horizontal plane;
- means operatively associated with said plate for intermittently rotating said plate into successive positions at predetermined times with intervening dwell periods; and
- means operatively associated with said plate for lifting a portion of said plate above said horizontal plane during said dwell periods to successively raise said receptacles into a position for receiving said sample intake device.

6. An apparatus as set forth in claim 5 wherein said intermittent rotating means includes a Geneva indexing mechanism.

7. In an apparatus for supplying samples to a sample intake device of an analyzing apparatus or the like, the combination of:
- a rotary plate having means for holding a plurality of samples in a row thereon;
- means mounting said plate for pivotal movement about an axis defined by a line lying substantially in the plane of said plate and offset from the center of rotation of said plate;
- means operatively associated with said plate for intermittently rotating said plate into successive positions at predetermined times with intervening dwell periods; and
- means operatively associated with said plate for pivoting said plate about said axis during said dwell periods to successively supply said samples to said sample intake device.

8. An apparatus as set forth in claim 7 wherein said intermittent rotating means comprises a Geneva indexing mechanism and a motor for driving said mechanism.

9. In an apparatus for supplying samples to a sample intake device of an analyzing apparatus or the like, the combination of:
- a base including three upstanding bearing surfaces;
- a rotatable plate having means for holding a plurality of samples in a row thereon, said plate being positioned on said bearing surfaces and being adapted to be pivoted about an axis defined by a line passing through two of said bearing surfaces; and
- means operatively associated with said plate for intermittently rotating said plate and pivoting said plate about said axis to supply said samples in succession to said sample intake tube.

10. An apparatus as set forth in claim 9 wherein said bearing surfaces are curved.

11. An apparatus as set forth in claim 9 wherein said bearing surfaces comprises three balls fixedly mounted on said plate and symmetrically positioned about a vertical axis, said axis being the axis of rotation of said plate.

12. In an apparatus for supplying samples to a sample intake device of an analyzing apparatus or the like, the combination of:
- a rotary plate having means for holding a plurality of samples in a circular row thereon adjacent the periphery of said plate;
- means mounting said plate for pivotal movement about an axis defined by a line lying substantially in the plane of said plate and offset from the center of rotation of said plate;
- means operatively associated with said plate for intermittently rotating said plate into successive positions at predetermined times with intervening dwell periods; and
- means operatively associated with said plate for pivoting said plate about said axis during said dwell periods to raise a portion of said plate into a position for receiving said sample intake device and to lower said portion of said plate from said sample intake device.

13. An apparatus as set forth in claim 12 wherein said rotating means comprises a Geneva indexing mechanism.

14. An apparatus as set forth in claim 12 wherein said pivoting means comprises a rotatable cam bearing against the underside of said plate.

15. In an apparatus for supplying samples to a sample intake device of an analyzing apparatus or the like, the combination of:
- a base including three upstanding bearing surfaces;
- a rotatable plate having means for holding a plurality of sample thereon in a circular row adjacent the periphery of said plate, said plate being positioned on said bearing surfaces and being adapted to be pivoted about an axis defined by a line passing through two of said bearing surfaces;
- means operatively associated with said plate for intermittently rotating said plate into successive positions at predetermined times with intervening dwell periods; and
- means operatively associated with said plate for pivoting said plate about said axis during said dwell periods to raise a portion of said plate into a position for receiving said sample intake device and to lower said portion of said plate from said sample intake device.

16. In an apparatus for supplying samples to a sample intake device of an analyzing apparatus or the like, the combination of:
- a base including three upstanding bearing surfaces;
- a rotatable plate having means for holding a plurality of sample thereon in a circular row adjacent the periphery of said plate, said plate being positioned on said bearing surfaces and being adapted to be pivoted about an axis defined by a line passing through two of said bearing surfaces;

a Geneva gear connected to said rotatable plate;

Geneva gear actuating means for intermittently rotating said plate into successive positions at predetermined times with intervening dwell periods; and cam means positioned to bear against the underside of said plate adjacent the third of said bearing surfaces for pivoting said plate about said axis during said dwell periods, said cam means raising a portion of said plate near said third bearing surface into a position for receiving said sample intake device and lowering said portion of said plate from said sample intake device during said dwell period.

17. An apparatus as set forth in claim 16 wherein said Geneva gear actuating means and said cam means are formed on a single rotatable member.

18. An apparatus as set forth in claim 16 wherein said Geneva gear actuating mechanism and said cam means are positioned on a single member rotatable about a vertical axis and said actuating mechanism and cam means are positioned on one side of said vertical axis.

No references cited.

LOUIS R. PRINCE, *Primary Examiner.*